US011840319B2

(12) United States Patent
Stasey et al.

(10) Patent No.: US 11,840,319 B2
(45) Date of Patent: Dec. 12, 2023

(54) ACTUATOR FOR INFLATION DEVICE

(71) Applicants: Brian Joseph Stasey, Fishers, IN (US); Mark A. Gummin, Silverton, OR (US)

(72) Inventors: Brian Joseph Stasey, Fishers, IN (US); Mark A. Gummin, Silverton, OR (US)

( * ) Notice: Subject to any disclaimer, the term of this patent is extended or adjusted under 35 U.S.C. 154(b) by 427 days.

(21) Appl. No.: 17/221,543

(22) Filed: Apr. 2, 2021

(65) Prior Publication Data

US 2022/0177091 A1 Jun. 9, 2022

Related U.S. Application Data

(60) Provisional application No. 63/123,309, filed on Dec. 9, 2020.

(51) Int. Cl.

*B63C 9/19* (2006.01)
*B60C 29/00* (2006.01)
*B63C 9/00* (2006.01)

(52) U.S. Cl.

CPC .................. *B63C 9/19* (2013.01); *B63C 9/24* (2013.01); *B63C 2009/0047* (2013.01); *F17C 2205/032* (2013.01)

(58) Field of Classification Search

CPC .... B63C 7/00; B63C 7/26; B63C 9/00; B63C 9/19; B63C 9/24; B63B 7/00; B63B 7/08; B63B 22/00; B63B 22/08; F17C 2205/032

USPC .......................................................... 441/95

See application file for complete search history.

(56) References Cited

U.S. PATENT DOCUMENTS 3,008,479 A 11/1961 Mancusi
3,579,964 A 5/1971 Ohlstein
3,597,780 A 8/1971 Coyle
4,046,157 A 9/1977 Cazalla et al.
4,232,417 A 11/1980 Miller et al.
4,493,664 A 1/1985 Dale
5,076,468 A 12/1991 Mackal
5,509,576 A 4/1996 Weinheimer et al.
6,260,570 B1 7/2001 Wass et al.
6,705,488 B2 * 3/2004 Mackal ..................... B63C 9/24 222/54
7,232,354 B2 6/2007 Olson et al.
7,572,161 B2 * 8/2009 Mackal ..................... B63C 9/24 441/95
7,669,616 B2 3/2010 Bruengger
7,988,511 B2 8/2011 Bissell et al.
8,826,931 B2 9/2014 Clark et al.
8,881,521 B2 11/2014 Browne et al.
9,045,207 B2 6/2015 Anderson et al.

(Continued)

FOREIGN PATENT DOCUMENTS

WO WO 2020/037355 A1 2/2020
WO WO 2021/023758 A1 2/2021

*Primary Examiner* — Lars A Olson

(57) ABSTRACT

An inflation device is provided including a shell, a pin, a restraining element, and a barrier. The shell may be coupled to an inflation canister. The pin is positioned within the shell in order to open a seal of the inflation canister. The restraining element is positioned within the shell and is positioned to prevent the pin from opening the seal of the inflation canister. The restraining element is dissolvable. The barrier is positioned within the shell. The barrier includes a fluid resistant skin and a heating element coupled to the fluid resistant skin. The heating element may open a portion of the barrier responsive to an electrical current running through the heating element.

20 Claims, 7 Drawing Sheets

(56) References Cited

U.S. PATENT DOCUMENTS

| | | | |
|---|---|---|---|
| 9,879,950 | B2 | 1/2018 | Moon et al. |
| 2008/0146105 | A1 | 6/2008 | Haselsteiner |
| 2020/0247513 | A1 | 8/2020 | Garner et al. |

* cited by examiner

ACTUATOR FOR INFLATION DEVICE

CROSS-REFERENCE TO RELATED APPLICATIONS

This application claims priority of Provisional Application Ser. No. 63/123,309 filed Dec. 9, 2020, entitled "Low Cost Electronic Initiators for Dissolving Pill Automatic Inflators."

TECHNICAL FIELD

This disclosure relates to actuators for use in inflation devices for inflating floatation devices such as life vests, buoys, rafts, and similar items, and in particular, to control mechanisms to prevent unintended actuation of inflation devices.

BACKGROUND

The statements in this section merely provide background information related to the present disclosure and may not constitute prior art.

Pressurized gas canisters are often used to inflate objects such as life vests, buoys, rafts, and other inflatable devices. Frequently, inflatable devices include a mechanism to automatically open a pressurized canister to allow inflation under certain conditions, such as the presence of water or a certain water pressure. For example, these mechanisms frequently include a dissolvable bobbin or a paper seal positioned to restrain a spring-biased piercing pin from puncturing a frangible seal of a pressurized gas canister. However, these mechanisms sometimes actuate in unintended circumstances, such as in high humidity conditions while in storage, when splashed, or when it is raining.

Systems which prevent unintended actuation may be costly or unreliable. For example, a piercing pin may be restrained by a linkage which is melted by resistance heat from electrical energy. However, the linkage typically must be large enough to restrain a piercing pin capable of delivering 50 pounds of static force to a frangible seal. In such inflation devices, a large amount of electrical energy and/or a large amount of time is typically needed to melt the linkage. Such a device may be excessively expensive, may require a large energy source to activate, or may take too much time to operate in a time-critical situation.

Other systems utilize multiple sensors linked to microprocessors to control valves and ports to control the actuation of the inflation device. Such systems may be reliable but require a large amount of electrical energy to operate, requiring larger, bulkier batteries. Such systems may be also expensive due to the cost of the sensors and microprocessors. Therefore, an actuator which requires a small amount of electrical energy would be cheaper, lighter, and more compact: and is therefore desirable. Furthermore, a reliable actuator which prevents unintended inflation is also desirable.

SUMMARY

Further areas of applicability will become apparent from the description provided herein. It should be understood that the description and specific examples are intended for purposes of illustration only and are not intended to limit the scope of the present disclosure.

In one embodiment, an inflation device is provided including a shell, a pin, a restraining element, and a barrier.

The shell may be coupled to an inflation canister. The pin is positioned within the shell in order to open a seal of the inflation canister. The restraining element is positioned within the shell and is positioned to prevent the pin from opening the seal of the inflation canister. The restraining element is dissolvable. The barrier is positioned within the shell. The barrier includes a fluid resistant skin and a heating element coupled to the fluid resistant skin. The heating element may open a portion of the barrier responsive to an electrical current running through the heating element.

In yet another embodiment, a restraining element is provided including a body, a barrier, and a heating element. The restraining element may be used to regulate inflation of an inflation device. The body of the restraining element includes a dissolvable material. The barrier encloses at least a portion of the body. The barrier includes a fluid resistant skin adapted to prevent the body from dissolving. The heating element is coupled to the fluid resistant skin. The heating element may open a portion of the barrier responsive to an electrical current running through the heating element.

In another embodiment, a method of activating an inflation device is provided. The inflation device includes an inflation canister, a shell coupled to the inflation canister, a pin positioned within the shell, a dissolvable restraining element positioned within the shell, a barrier, and a heating element coupled to the barrier. The pin is adapted to open a seal of the inflation canister. The restraining element is adapted to prevent the pin from opening the seal of the inflation canister. The barrier is adapted to prevent the restraining element from dissolving. The method includes supplying an electrical current to the heating element, opening the barrier by heat generated from electrical resistance within the heating element, at least partially dissolving the restraining element, and allowing the pin to open the seal of the inflation canister.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

Figure 1:
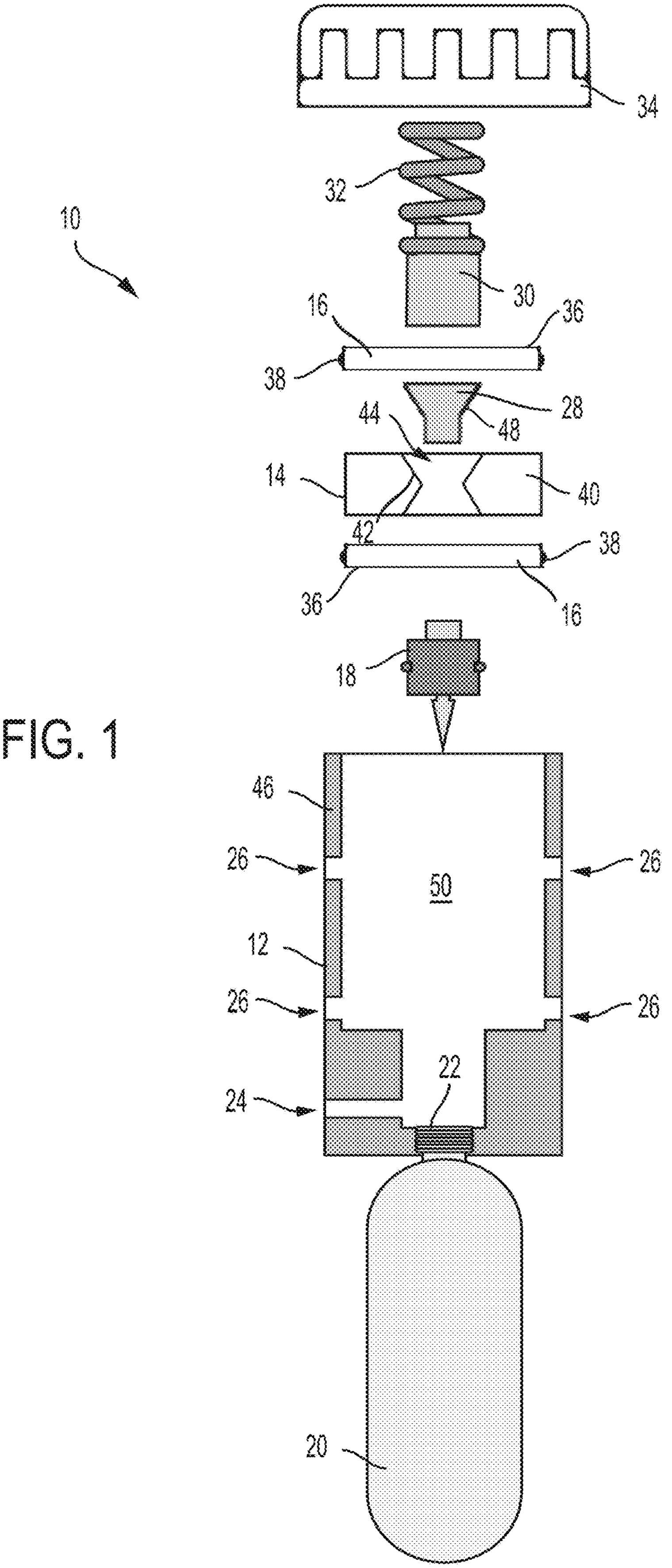
FIG. 1 illustrates an exploded cross-sectional side view of a first example of an inflation device, including a shell, a pin, a restraining element, and a barrier.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, an inflation device is provided including a shell, a pin, a restraining element, and a barrier. The shell may be coupled to an inflation canister. The pin is positioned within the shell in order to open a seal of the inflation canister. The restraining element is positioned within the shell and is positioned to prevent the pin from opening the seal of the inflation canister. The restraining element is dissolvable. The barrier is positioned within the shell. The barrier includes a fluid resistant skin and a heating element coupled to the fluid resistant skin. The heating element may open a portion of the barrier responsive to an electrical current running through the heating element.

One technical advantage of the systems and methods described below may be that an inflation device described herein may be substantially cheaper than other inflation devices. The inflation device described below may require only a small amount of electrical energy and may therefore operate with a relatively small battery, typically requiring no more 5 joules (e.g. 1 watt for 5 second, 5 watts for 1 second, etc.). Comparatively, other, expensive inflation devices may include microprocessors, multiple sensors, or high-power melting wires, all of which require a larger battery, and which raises the cost of the actuator.

Another technical advantage of the systems and methods described below may be that the inflation devices described herein may be substantially more reliable than other inflation devices. The inflation devices described herein may prevent unintended actuation by protecting dissolvable components until a desired pre-condition has been met. Other inflation devices may not protect dissolvable components and may therefore activate at undesirable times, such as during storage in high humidity conditions.

Yet another technical advantage of the systems and methods described below may be that the inflation devices described herein may activate more quickly and more reliably when needed when compared with other inflation devices. Typically, self-inflating floatation devices, must inflate within 10 seconds of encountering the water, ideally within less than 5 seconds. The inflation devices described herein require only a small amount of electrical energy and only need to function for a short period of time in order to operate. Additionally, the inflation devices described herein have a small number of simple components which decreases the chance that a critical component may fail when needed. Comparatively, some inflation devices require too much amount of time and/or energy in order to fully operate (e.g., by melting a thick restraining component). Additionally, some other inflation devices incorporate complex parts such as delicate sensors and microprocessors which may become non-functional with rough use.

FIG. 1 illustrates and exploded cross-sectional side view of a first example of an inflation device 10 including an inflation canister 20, a shell 12, a piercing pin 18, two barriers 16, a restraining element 14, a transfer pin 28, a striker pin 30, a biasing mechanism 32, and a cap 34. The inflation device 10 may be any device which may be used to automatically inflate a floatation device such as a life vest, buoy, or raft. Examples of the inflation device 10 may include a pump or a mechanism for releasing a canister of compressed fluid. The inflation canister 20 may be any component which is capable of supplying fluid, such as air or another gas, for inflation of a floatation device. Examples of the inflation canister 20 may include a tube of compressed air; a cylinder of compressed carbon dioxide, or a pump supplying atmospheric air. The inflation canister 20 may include a seal 22 over an outlet of the inflation canister 20. The seal 22 may be any part of the inflation canister 20 which may be easily broken, pierced, or otherwise removed, to allow fluid from the inflation canister 20 inflate a floatation device. The seal 22 may require between 30-60 pounds, but typically 50 pounds of static force to open. The size of the inflation canister 20 may vary but may have a weight of roughly 20 grams.

The shell 12 may be any portion of the inflation device 10 which may be coupled to the inflation canister 20 and which contains at least some of the components of inflation device 10. Examples of the shell 12 may include a cylinder, a tube, or a box. The shall 12 may have an interior 50 defined by a wall 46. The components of the inflation device 10 may be positioned within the interior 50. The shell 12 may be made of any material capable of holding components of the inflation device 10, such as metal or plastic.

The wall 46 of the shell 12 may define an inflation port 24 proximate to the inflation canister 20. The inflation port 24 may be any opening in the wall 46 of the shell 12 through which fluid may escape from the inflation canister 20 to inflate a floatation device. The wall 46 of the shell 12 may also define one or more water ports 26. The water port 26 may be any opening in the wall 46 of the shell 12 through which water can enter the interior 50 of the shell 12. The wall 46 may define between 1 and 4 water ports to allow water to quickly enter the interior 50 of the shell when needed. In some embodiments, multiple water ports 26 on multiple opposing sides of the shell 12 may be desirable to allow water to enter the interior 50 when needed and also to allow and residual air to escape from the interior 50. A single water port 26 on a single side of the shell 12 could cause a back pressure of residual air within the interior 50, depending on the orientation of the shell 12, thereby preventing water from effectively entering the interior 50 and dissolving the restraining element 14.

The piercing pin 18 may be any component of the inflation device 10 which is capable of piercing or otherwise opening the seal 22 of the inflation canister 20. Examples of the piercing pin 18 may include a javelin-tipped needle, a blade, or even a contact-actuated explosive device. The piercing pin 18 may be positioned within the interior 50 of the shell 12 proximate to the seal 22 of the inflation canister 20. Although the un-actuated position of the piercing pin 18 may vary, typically, the un-actuated piercing pin 18 may be positioned approximately 0.1 inches from the seal 22 of the inflation canister 20. Therefore, the work product needed to pierce the seal 22 may be approximately 5.0 inch-pounds. The piercing pin 18 may also interact with the wall 46 of the shell 12 to isolate the inflation port 24 from the water ports 26 of the shell 12, preventing water from entering the floatation device, and preventing the inflation fluid from exiting the inflation device 10 except through the inflation port 24.

The restraining element 14 may be any component which may be positioned within the interior 50 of the shell 12 to prevent the piercing pin 18 from piercing the seal 22 of the inflation canister 20. Examples of the restraining element 14 may include a sheet, a donut, a pill, or a bobbin. The body of the restraining element 14 may be made of a material 40 which may be dissolvable to allow actuation of the inflation device 10 once the material 40 of the restraining element 14 has at least partially dissolved. The material 40 of the restraining element 14 may be made of any dissolvable material, such as paper, cellulose, or polyvinyl alcohol. In some embodiments, the restraining element 14 may be positioned between water ports 26 to allow rapid dissolution of the restraining element 14 when needed.

The restraining element 14 may have an interior surface 42 which is shaped to define an opening 44 through the center, or near the center of the restraining element 14. The transfer pin 48 may be any component which may fit into this opening 44 and which may be used to force the piercing pin 18 to open the seal 22 of the inflation canister 20. Advancement of the transfer pin 48 onto the piercing pin 18 may be prevented by the transfer pin 48 resting against the interior surface 42 of the restraining element 14. For example, the interior surface 42 of the restraining element 14 may be sloped to interact with a matching sloping surface of the transfer pin 48, such that when the restraining element 14 at least partially dissolves, the transfer pin 48 may be advanced through the opening 44 of the restraining element 14 and onto the piercing pin 18.

The barrier 16 may be any component of the inflation device 10 which is positioned to prevent the material 40 of the restraining element 14 from dissolving. Examples of the barrier 16 may include a disc, a coating, a film, a screen, or other wrap or covering. The barrier 16 may include a fluid resistant skin 36 which may prevent infiltration of water to prevent the unintended dissolution of the material 40 of the barrier 16. Examples of the fluid resistant skin 36 may include wax, latex, polyethylene, polycaprolactone, or a thermoplastic. The material of the fluid resistant skin 36 may have a melting point of no more than 150 degrees Fahrenheit, or at least a deformation point of no more than 150 degrees Fahrenheit. In some embodiments, the fluid resistant skin 36 may be extended across the barrier 16 in tension such that if a portion of the fluid resistant skin 36 is broken or cracked, a large opening in the fluid resistant skin 36 will quickly form, allowing water or other fluids to pass through the barrier 16. In some embodiments, the barrier 16 may at least partially enclose a portion of the restraining element 14.

The barrier 16 may also include a sealing edge 38 which may encircle the fluid resistant skin 36. The sealing edge 38 may be any part of the barrier 16 which interacts with the wall 46 of the shell 12 and prevents fluid from infiltrating past the barrier 16. Examples of the sealing edge 38 may include an O-ring, or a gasket.

The striker pin 30 may be any component of the inflation device 10 which is positioned within the interior 50 of the shell 12 to force the advancement of the transfer pin 28 and thereby advance the piercing pin 18 into the seal 22 of the inflation canister 20. Examples of the striker pin 30 may include a bolt or a lug. While the inflation device 10 is in the unactuated position, the striker pin 30 may rest on the barrier 16, prevented from contacting or advancing the transfer pin 28. Once the barrier 16 has opened, the striker pin 30 may be advanced through the barrier 16 onto the transfer pin 28. Once the restraining element 14 has at least partially dissolved, the striker pin 30 may advance, forcing the transfer pin 28 through the restraining element 14 and onto the piercing pin 18 to open the seal 22.

The biasing mechanism 32 may be any component which biases the striker pin 30 towards advancement onto the transfer pin 28. Examples of biasing mechanism 32 may include a spring, a lever, or a piston. As shown in FIG. 1, the biasing mechanism 32 may be a spring which is maintained in compressive tension between the striker pin 30 and the cap 34 while the inflation device 10 is in the unactuated position. When the barrier 16 is opened, and the restraining element 14 is at least partially dissolved, the biasing mechanism 32 may expand, generating the force necessary for the piercing pin 18 to pierce the seal 22.

The cap 34 may be any component of the inflation device 10 which is coupled to the shell 12 and the biasing mechanism 32. In some embodiments, the cap 34 may be threaded to be screwed onto matching screws on the shell 12 such that the force stored in the biasing mechanism 32 may be adjusted by rotating the cap 34 relative to the shell 12. In some embodiments, the cap 34 may also seal the interior 50 of the shell 12 from unintended infiltration of water or other fluids.

Figure 2:
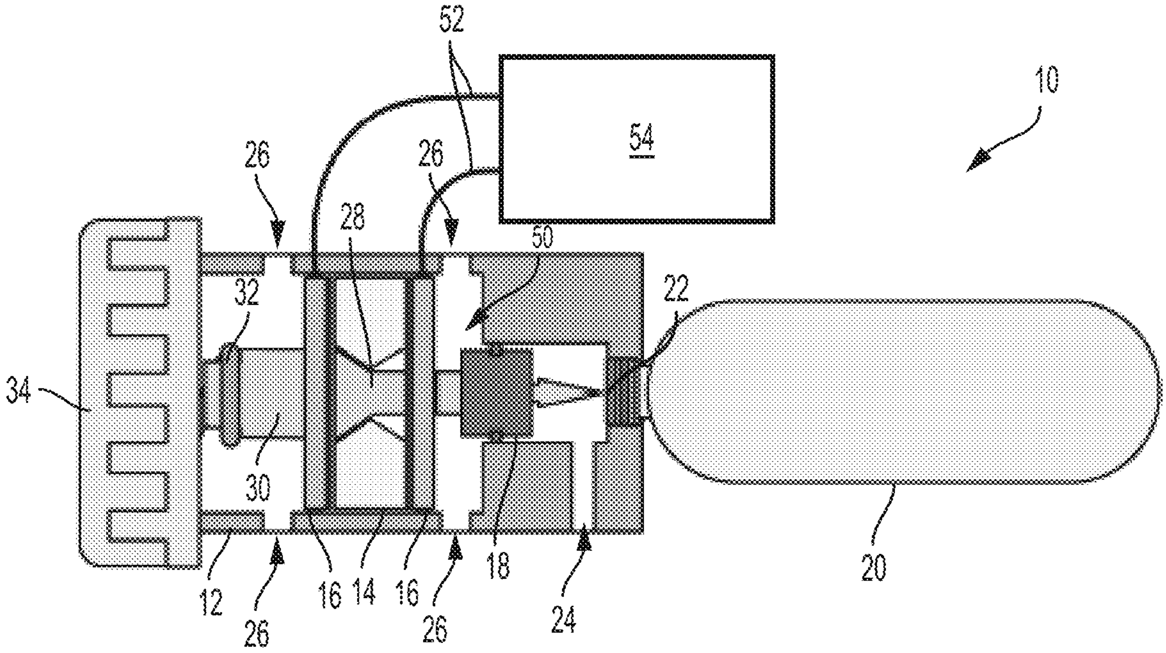
FIG. 2 illustrates a cross-sectional side view of a second example of an inflation device, including a shell, a pin, a restraining element, and a barrier.

FIG. 2 illustrates a cross-sectional side view of an example of the inflation device 10. The inflation device 10 may include an electrical energy source 54 coupled to the barrier 16 through wires 52. The electrical energy source 54 may be any component which may selectively apply electrical energy to the barrier 16 to open the barrier 16. Once the barrier 16 has been opened, the inflation device 10 may be actuated once water or another fluid enters the interior 50 of the shell 12, such as when the inflation device 10 is submerged within water. In some embodiments, the barrier 16 may not open until a sufficient external water pressure is detected by the inflation device 10. Examples of the electrical energy source 54 may include a battery or an external power supply. In some embodiments, the electrical energy source 54 may be one or more AAA dry-cell battery or one or more 3-volt CR2032 Lithium coin cell battery. The electrical energy source 54 may be positioned within the shell 12, may be coupled to the exterior of the shell 12, or may be separated apart from the shell 12. In some embodiments, the electrical energy source 54 may only be required to provide no more than 10 joules of electrical energy (but ideally no more than 5 joules) over no more than 1 second to allow quick actuation of the inflation device 10. In some embodiments, such as where the electrical energy source 54 is capable of providing only a small electrical current, other components may be used to convert the electrical energy from the electrical energy source 54 to a higher voltage current.

Figure 3:
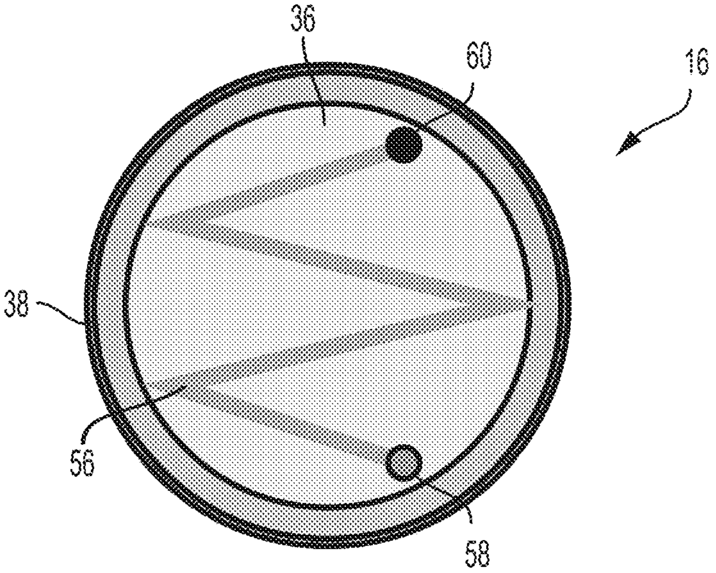
FIG. 3 illustrates a cross-sectional top-down view of an example of a barrier including a heating element.

FIG. 3 illustrates an example of the barrier 16, including the sealing edge 38 and a heating element 56 coupled to the fluid resistant skin 36. The heating element may be any component adapted to open a portion of the barrier responsive to electrical current running through the heating element 56. Examples of the heating element 56 may include an electrical wire or an electrically activated squib. The heating element 56 may be coupled to an exterior of the fluid resistant skin 36 or may be embedded within the fluid resistant skin 36. The heating element 56 may proceed through or across the fluid resistant skin 36 from a supply 58 to a ground 60. Each of the supply 58 and ground 60 may be coupled to the electrical energy source 54 through the wires 52 shown in FIG. 2. In some embodiments, the heating element 56 may be a very fine wire having a diameter of approximately 0.003 inches, as smaller diameter wires may more effectively provide the energy required to open the barrier. The heating element 56 may be made of any material providing adequate thermal electrical resistance properties, such as nichrome. In other embodiments, a shape memory alloy, such as nitinol, may be used for the heating element 56. As illustrated, the heating element 56 may extend across the fluid resistant skin 36 in a zig-zag pattern or any other configuration effective for opening the barrier 16.

In some embodiments, the heating element 56 may be a circuit board having a metal inlay on a flexible substrate. The metal inlay may be any conductive material such as copper. The flexible substrate may be any flexible material such as plastic. The circuit board may have multiple layers of metal inlay. The metal inlay may be as narrow as 0.004 inches. Such a heating element 56 may be coupled to the fluid resistant skin 36 of the barrier 16 or may be incorporated into the fluid resistant skin 36.

When electrical energy is applied to the heating element 56, the heating element may quickly increase in temperature due to the electrical resistance within the heating element. The increased temperature of the heating element 56 may cause the fluid resistant skin 36 to melt or otherwise rupture, opening the barrier 16 and allowing fluid to reach the restraining element 14.

Figure 4:
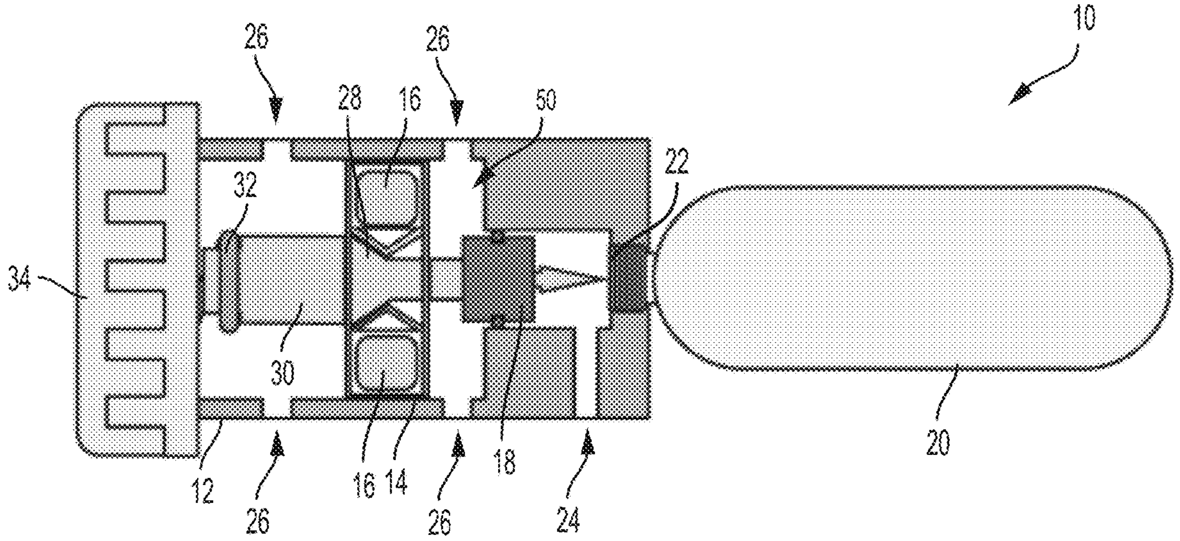
FIG. 4 illustrates a cross-sectional side view of a third example of an inflation device, including a shell, a pin, a restraining element, and a barrier.

FIG. 4 illustrates a cross-sectional view of another embodiment of the inflation device 10. In some embodiments, the material 40 of the restraining element 14 may not be dissolvable by water but may be quickly dissolvable by another solution, such as hydrochloric acid, sulfuric acid, or acetone. In such an embodiment, the barrier 16 may be a capsule containing the solvent solution suitable for dissolving the restraining element 14. In such an embodiment, the fluid resistant skin 36 may be made of a material which does not degrade when exposed to the solvent solution. The fluid resistant skin 36 may contain the solvent solution within the capsule, as shown in FIG. 4, with the heating element 56 embedded within the fluid resistant skin 36 or otherwise coupled to the fluid resistant skin 36. The barrier 16 may be contained within the interior 50 of the shell 12 or may be embedded within the material 40 of the restraining element 14. When the heating element 56 opens the barrier 16, the solvent solution may dissolve the restraining element 14, allowing the piercing pin 18 to open the seal 22.

Figure 5:
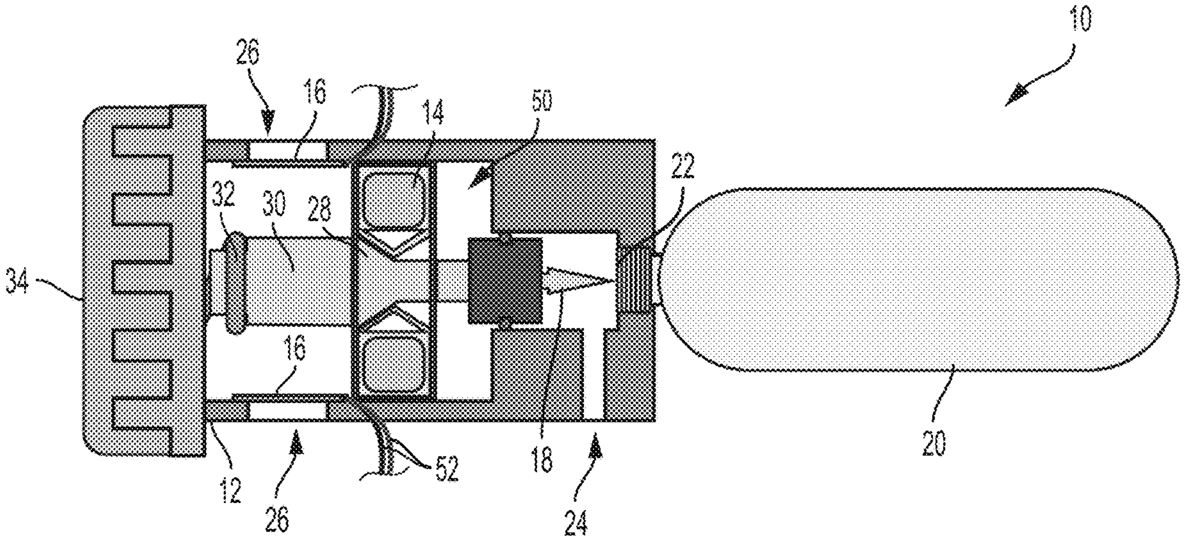
FIG. 5 illustrates a cross-sectional side view of a fourth example of an inflation device, including a shell, a pin, a restraining element, and a barrier.

FIG. 5 illustrates a cross-sectional view of yet another embodiment of the inflation device 10. In some embodiments, the barrier 16 may be positioned against the wall 46 of the shell 12 to obstruct the water port 26. In such an embodiment, water and other fluids may be prevented from reaching the interior 50 of the shell 12 even when inflation device 10 is submerged. However, after the heating element 56 has opened the barrier 16, water may enter the interior 50 and begin to dissolve the restraining element 14. In some embodiments, more than one barrier 16 may be utilized to cover each water port 26. In some embodiments, the water port 26 may be a slot extending about the circumference of the shell 12. In such embodiments, the barrier 16 may be an elongated strip extending about the circumference of the shell 12 to cover the entire water port 26. The heating element 56 may extend along the entire strip to allow uniform opening of the barrier 16.

As illustrated in FIG. 5, the barrier 16 may be positioned across the water port 26 on the inside of the wall 46 of the shell 12. In such an embodiment, the wires 52 may extend through the interior 50 of the shell 12, may be embedded within the wall 45 of the shell 12, or may pass through the wall 46 of the shell 12 to reach the electrical energy source 54. Alternatively, the barrier 16 may be positioned across the water port 26 on the outside of the wall 46 of the shell 12, or within the water port 26.

Figure 6:
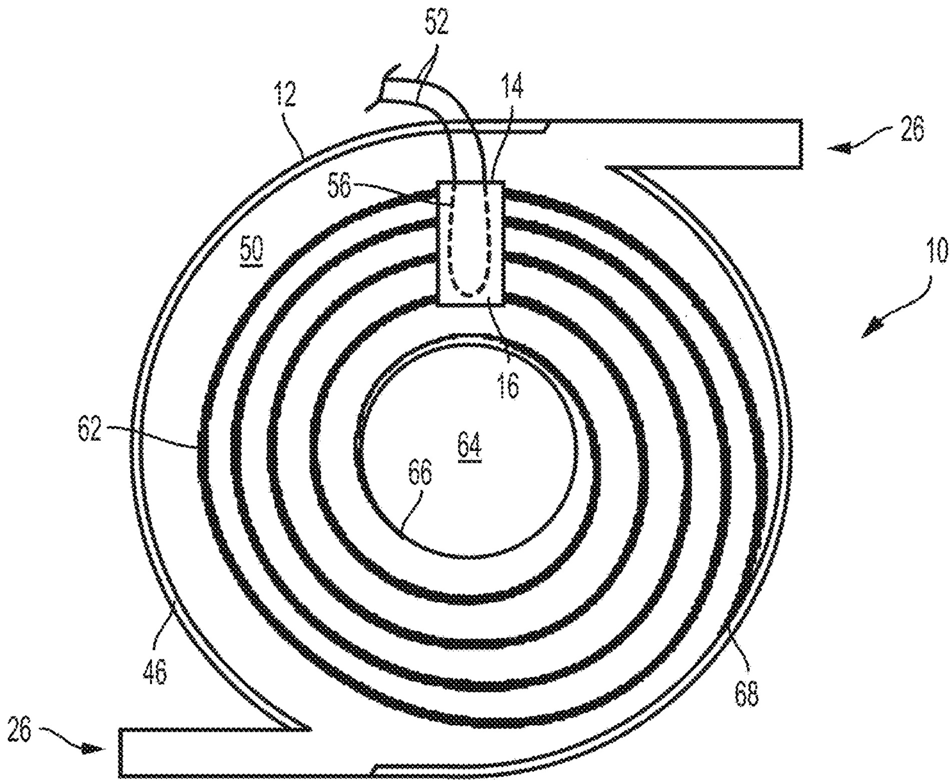
FIG. 6 illustrates a cross-sectional side view of a fifth example of an inflation device, including a shell, a restraining element, and a barrier.

FIG. 6 illustrates a cross-sectional view of another embodiment of the inflation device 10. In some embodiments, the transfer pin 28, the striker pin 30, and the biasing mechanism 32 may be replaced by a coiled spring 62 in the interior 50 of the shell 12 and wrapped around a hub 64. The coiled spring 62 may be compressed in an unactuated position by the restraining element 14. In such an embodiment, multiple windings of the coiled spring may be compressed together by the restraining element 14, which may wrap entirely around the windings to hold them together. When the restraining element 14 dissolves, the windings of the coiled spring 62 may be released, allowing the coiled spring 62 to expand within the shell 12 and rotate to an actuated position. The coiled spring 62 may be coupled to the hub 64 at a first end 66 of the coiled spring 62 and coupled to the wall 46 of the shell 12 at a second end 68 such that rotation of the coiled spring 62 causes the hub 64 to also rotate. The hub 64 may be coupled to the piercing pin 18 in such a way that rotation of the hub 64 causes the piercing pin 18 to open the seal 22 of the inflation canister 20 (not shown).

In the embodiment shown in FIG. 6, the barrier 16 may be a coating which partially or entirely covers the restraining element 14, such as a coating of wax. The heating element 56 may be embedded within the barrier 16 and may wrap around the length of the restraining element 14. When the heating element 56 begins to heat, the wax coating barrier 16 may quickly melt, allowing water or another fluid from the water port 26 to quickly dissolve the restraining element 14 and release the coiled spring 62.

In some embodiments, heating of the heating element 56 may directly cause dissolution of the restraining element 14. For example, if the restraining element 14 is made of paper, heating of the heating element 56 coupled to the restraining element 14 may cause the restraining element to burn. Furthermore, if the barrier 16 is made of an insulating, but brittle material, such as a thin wax coating, heating of the heating element 56 may more efficiently cause the dissolution of the restraining element 14, requiring less electrical energy to actuate the inflation device 10.

Figure 7:
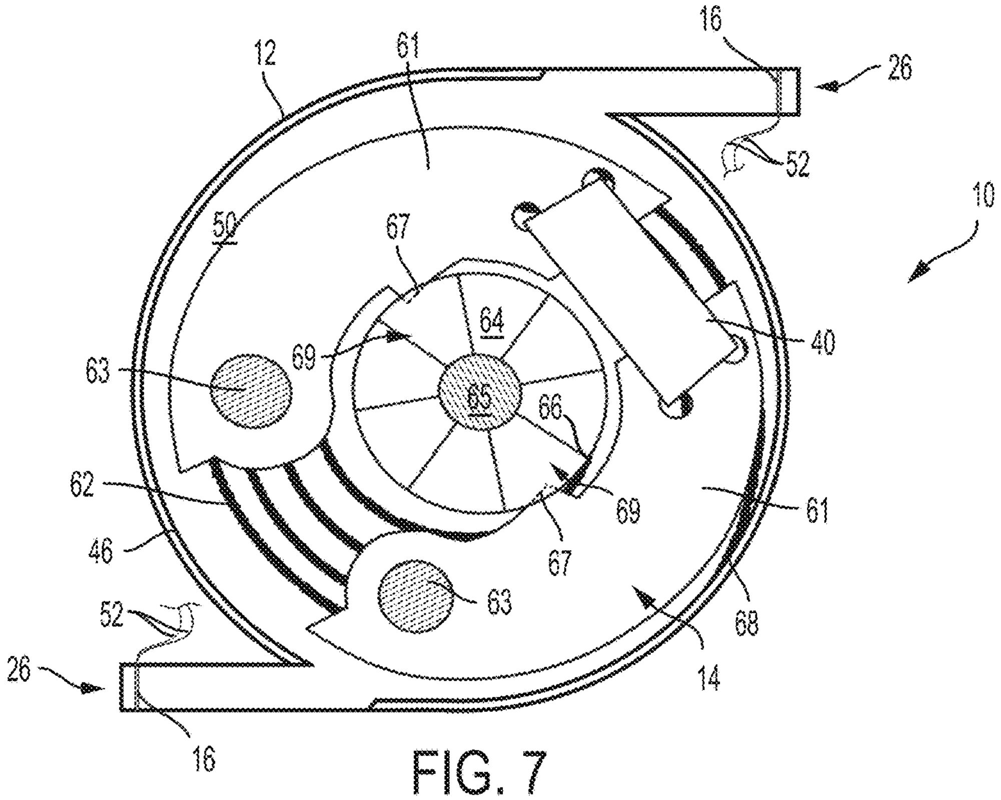
FIG. 7 illustrates a cross-sectional side view of a sixth example of an inflation device, including a shell, a restraining element, and a barrier.

FIG. 7 illustrates a cross-sectional view of an alternative embodiment of the inflation device shown in FIG. 6. As shown in FIG. 7, the barrier 16 may be positioned over the water ports 26 to prevent water or other fluid from entering the interior 50 of the shell 12. In such an embodiment, the restraining element 14 may not have a wax coating or other non-dissolvable protection.

FIG. 7 also illustrates an alternative embodiment of the restraining element 14 including two releasing arms 61 held together by the dissolvable material 40. As illustrated, the releasing arms 61 may include tabs 67 which interact with catches 69 in the hub 64 to prevent rotation of the hub 64. The releasing arms 61 may also include biased pivots 63 which bias the releasing arms 61 to retract the tabs 67 from the catches 69 when the dissolvable material 40 dissolves. Once the tabs 67 have been retracted from the catches 69, the hub 64 may be biased to spin from tension built up in the coiled spring 62. Rotation of the hub 64 may cause rotation of an axle 65 coupled to the hub 64. Rotation of the axle 65 may then induce the piercing pin 18 to open the seal 22 of the inflation canister 20.

Figure 8:
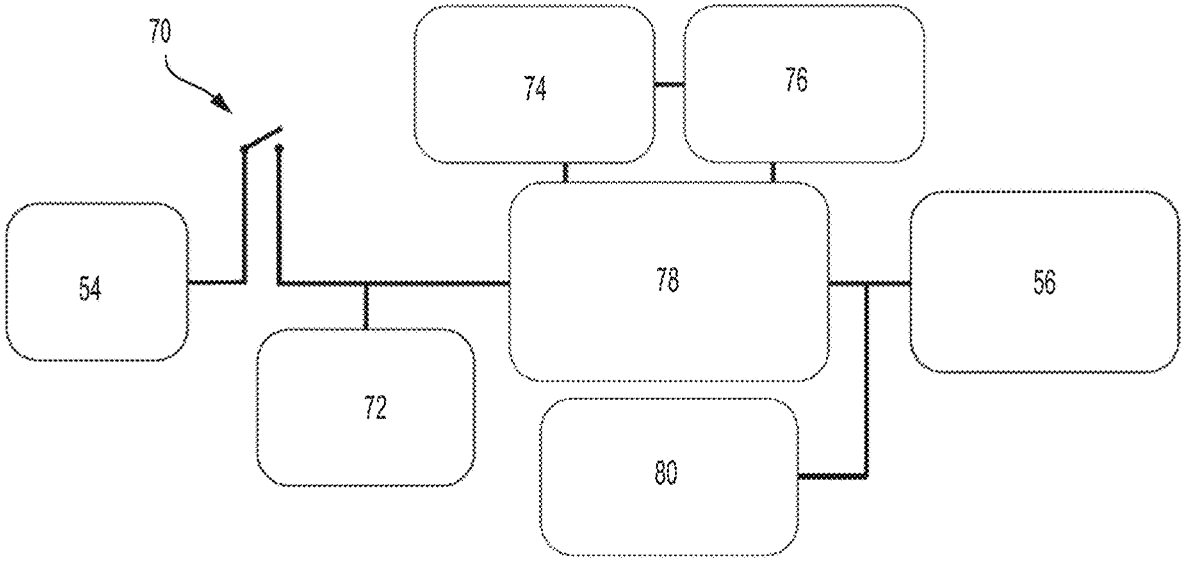
FIG. 8 illustrates a flow diagram of an example of an electrical system for an actuator, including a heating element and an energy source.

FIG. 8 illustrates a flow diagram of an example of the electrical operations of the inflation device 10. The electrical energy source 54 may be separated from the other electrical components by an arming mechanism 70. The arming mechanism 70 may be any device which may be selectively opened or closed to respectively de-energize or energize the electrical components of the inflation device 10. Examples of the arming mechanism 70 may include a pull-tab, a button, or a clasp on a life vest. In some embodiments, the arming mechanism 70 may not be present, allowing at least some of the electrical components of the inflation device 10 to be energized constantly.

In some embodiments, closing the arming mechanism 70 may directly energize the heating element 56, opening the barrier 16 and allowing the restraining element 14 to dissolve whenever the inflation device 10 is subsequently submerged. In such embodiments, the barrier 16 may protect the inflation device from actuating in an unintended circumstance, such as in storage. However, if the barrier 16 cannot be resealed, the inflation device 10 may not be re-usable once the arming mechanism 70 has been closed.

In some embodiments, while the arming mechanism 70 is closed, a switching circuit 78 may be energized along with one or more sensors (74, 76). The switching circuit 78 may be any component which selectively energizes the heating element 56 based on inputs received from the sensors (74, 76). Examples of the switching circuit 78 may include a micro-controller, a micro-processor, a threshold-based discriminator circuit, or a MOSFET circuit. The sensors (74, 76) may be any component which sense a condition external to the inflation device 10 and send inputs to the switching circuit 78. One or both of the sensors (74, 76) may indicate an actuation condition, causing the switching circuit 78 to energize the heating element 56, thereby causing the barrier 16 to open.

For example, in one embodiment a first sensor 74 may be a water pressure circuit, detecting the water pressure external to the inflation device 10, and a second sensor 76 may be a pair of water sensing electrodes, detecting the presence of water. In such an embodiment, the switching circuit 78 may be configured to energize the heating element 56 only when both the first sensor 74 and the second sensor 76 are indicating an actuation condition, such as the presence of water and a sufficient water pressure.

In some embodiments, a capacitor 72 may also be included between the arming mechanism 70 and the switching circuit 78. The capacitor 72 may be any device which is electrically coupled to the electrical energy source 54, which stores electrical charge from the electrical energy source 54 and which may selectively deliver electrical charge to the heating element 56. Examples of the capacitor 72 may include a double-layer supercapacitor or an electrochemical pseudocapacitor. Once the arming mechanism 70 has been closed, the capacitor 72 may begin charging from the electrical energy source 54. Once the switching circuit 78 has energized the heating element 56, the capacitor 72 may rapidly discharge its stored electrical charge into the heating element 56, allowing the heating element 56 to rapidly heat up and open the barrier 16. The capacitor 72 may be charged slowly from the electrical energy source 54 and may be discharged quickly, allowing a smaller, lighter, and less expensive electrical energy source 54 to be used in the inflation device 10.

In some embodiments, the capacitor 72 may be used to accommodate a cheaper, more light weight electrical energy source 54 having lower voltage or amperage. For example, the electrical energy source 54 may be a coin battery providing only 20 milliamps and 3 volts. Once the arming mechanism 70 has been closed, the capacitor 72 may be trickle-charged by the electrical energy source 54 to ready the inflation device 10 for actuation. The capacitor 72 may also utilize a boost converter (not shown) adapted to step up voltage from the electrical energy source 54. For example, the boost converter may step up the 3 volts from the coin battery electrical energy source 54 to 5.4 volts within the capacitor 72. When the higher voltage electrical energy within the capacitor 72 is released into the heating element 54, the electrical energy released may be between 3-10 joules delivered over 1-2 seconds (or 10 watts for 1 second), sufficient to melt the fluid resistant skin 36 and open the barrier 16.

In some embodiments, an override switch 80 may be included. The override switch 80 may be any component capable of resetting the electrical components of the inflation device 10 or at least preventing energizing of the heating element 56. Examples of override switch 80 may include a button or a toggle switch. In some embodiments, the switching circuit 78 may have a predetermined delay between detecting actuation conditions and energizing the heating element 56. During this delay period, a light on the inflation device 10 may flash or a warning sound may play, alerting a user that the inflation device 10 is about to actuate. If the user does not wish the inflation device 10 to actuate, the override switch 80 may be used to prevent energizing of the heating element 56. For example, use of the override switch 80 may prevent the switching circuit 78 from energizing the heating element 56 or may open the arming mechanism 70. The override switch 80 may be used to prevent unintended actuation of the inflation device 10 and increase the potential for re-usability of the inflation device 10.

In some embodiments, every electrical component shown in FIG. 8 may be included on a single printed circuit board. In other embodiments, each component may be separated from each other, or may be grouped together on multiple printed circuit boards.

Figure 9:
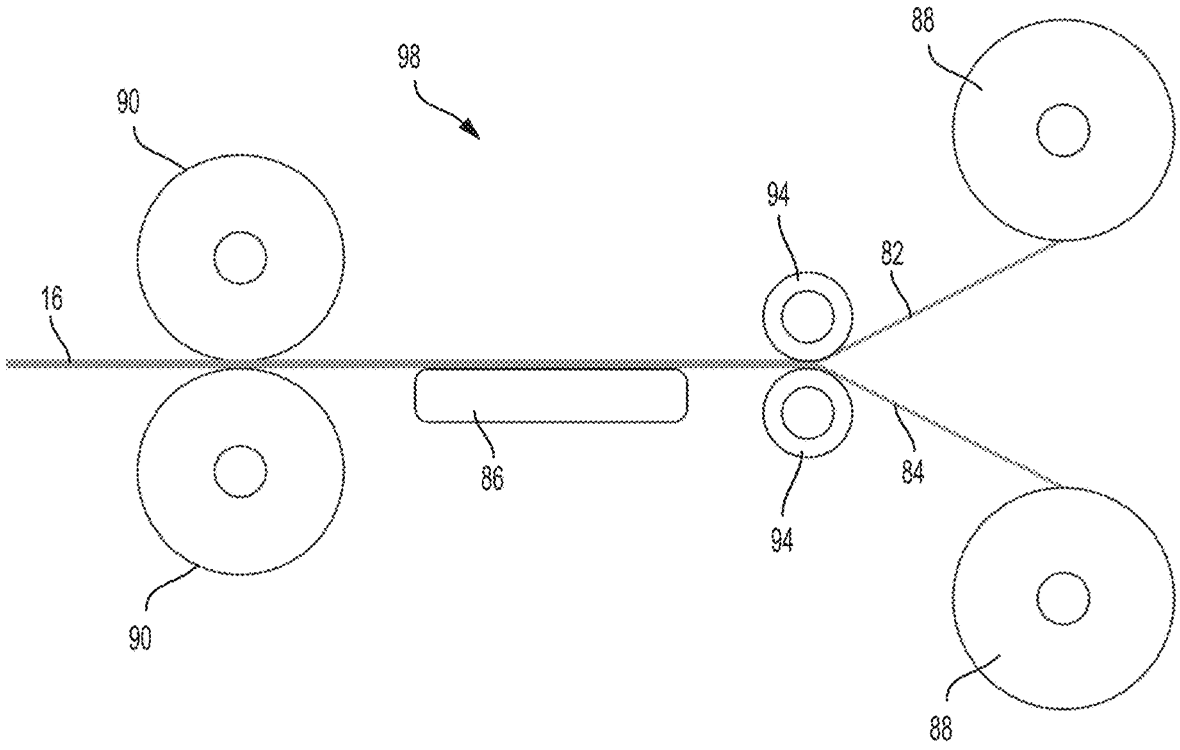
FIG. 9 illustrates a cross-sectional side view of an example of an apparatus for manufacturing a barrier.

FIG. 9 illustrates a cross-sectional view of an apparatus 98 for manufacturing an embodiment of the barrier 16. The apparatus 98 includes at least one polymer rollers 88. The polymer rollers 88 may be any object which supplies and unspools a layer of polymer to form a portion of the fluid resistant skin 36. Examples of the polymer roller 88 may include drums, spools, or cylinders. As shown in FIG. 9, two polymer rollers 88 may be used to form a first layer 82 and a separate second layer 84 of the fluid resistant skin 36. The first layer 82 and the second layer 84 may be aligned or coupled together after passing through one of more idlers 94.

The apparatus 98 may also include a wire application device 86 configured to couple the heating element 56 to the fluid resistant skin 36. The heating element 56 may be coupled to either the first layer 82 or the second layer 84. In some embodiments, the wire application device 86 may install the heating element 56 between the first layer 82 and the second layer 84.

The apparatus 98 may also include a heat sealer 90 adapted to partially melt the first layer 82 and the second layer 84 into the single fluid resistant skin 36. While passing through the heat sealer 90, the heating element 56 may be partially melted into the fluid resistant skin 36 or may be sealed within the fluid resistant skin 36. After passing through the heat sealer 90 and cooling, the individual barriers 16 may be cut out and placed in the inflation device 10. By utilizing the apparatus 98 illustrated in FIG. 9, the barriers 16 may be mass produced in a continuous process.

Figure 10:
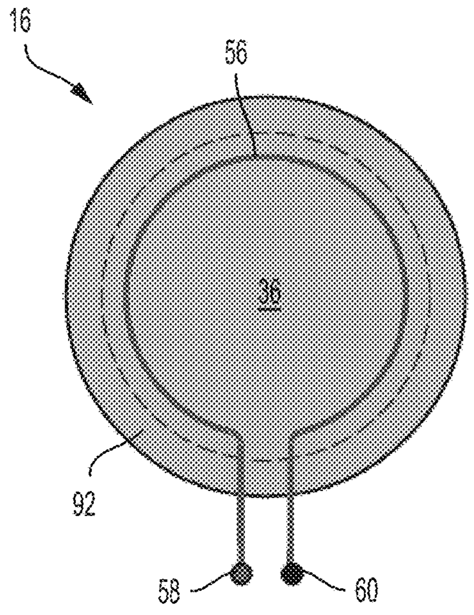
FIG. 10 illustrates a cross-sectional top-down view of a second example of a barrier including a heating element.
Figure 11:
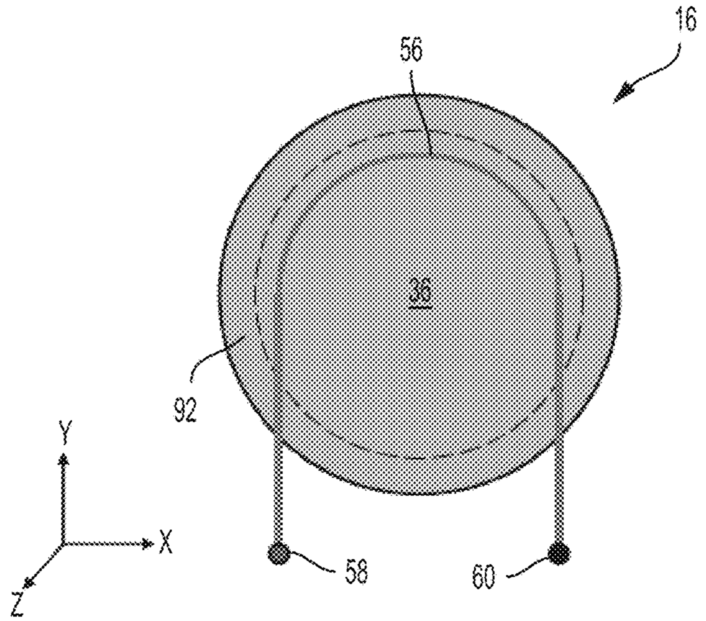
FIG. 11 illustrates a cross-sectional top-down view of a third example of a barrier including a heating element.

FIGS. 10 and 11 illustrate alternative configurations of the barrier 16. The barrier 16 may have a sealing edge 92 which extends around an outer portion of the fluid resistant skin 36. The sealing edge 92 may be any portion of the barrier 16 which is adapted to be coupled to a portion of the shell 12 to seal a portion of the interior 50 from fluid intrusion. For example, adhesive may be applied to the sealing edge 92 so that the sealing edge 92 seals against the shell 12. Alternatively, the sealing edge 92 may be melted into the shell 12 to seal a water port 26.

FIGS. 10 and 11 also illustrate different arrangements of the heating element 56 along the fluid resistant skin 36. For example, FIG. 10 illustrates the heating element 56 arranged in a nearly circular arrangement while FIG. 11 illustrates the heating element 56 arranged in a horseshoe arrangement. When the heating element 56 is actuated, both arrangements may result in a flap opening in the barrier 16, easily allowing water or other fluids to pass through the barrier 16.

In some embodiments, such as where the heating element 56 is made from a shape memory alloy such as nitinol, a pre-formed curve may be set in the heating element 56 before the heating element is applied to the barrier 16. Once the heating element 56 begins to increase in temperature from electrical resistance heating (Joule heating), such a pre-formed curve would allow the heating element 56 to bend and pull the melting fluid resistant skin 36 to further open the barrier 16. For example, in the embodiment shown in FIG. 11, the heating element 56 may be initially arranged along the X-axis and Y-axis. However, once the temperature of the heating element 56 begins to increase, the heating element 56 may move along the Z-axis to further open the barrier 16 as the fluid resistant skin 36 melts. The heating element 56 may be heat set to bend in the direction of fluid flowing through the barrier 16 so as not to resist the flow of the fluid.

Figure 12:
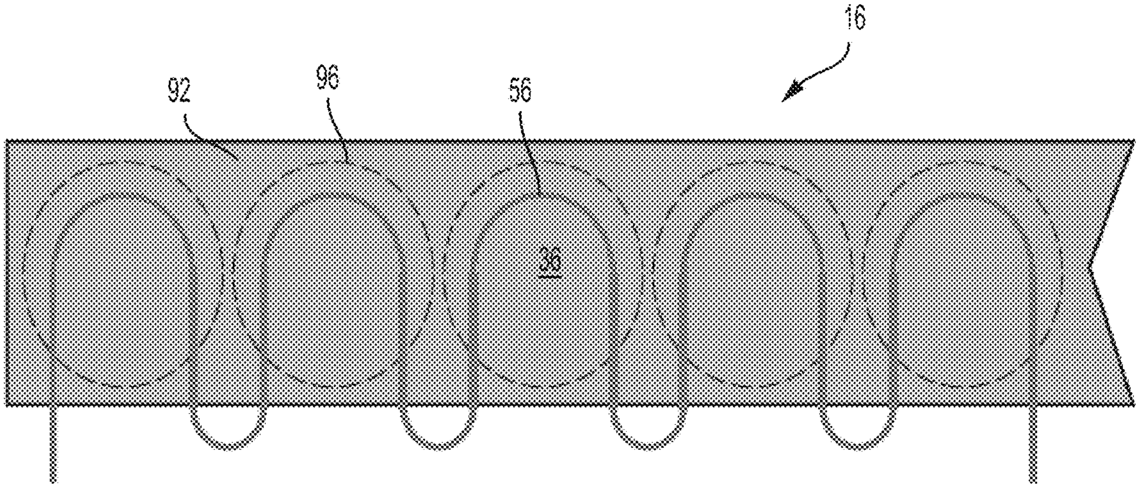
FIG. 12 illustrates a cross-sectional top-down view of a fourth example of a barrier including a heating element.

FIG. 12 illustrates a barrier 16 formed as a ribbon. As illustrated, in such an embodiment, the heating element 567 may weave back and forth across the length of the fluid resistant skin 26, ensuring that when the heating element is actuated, the barrier 16 is quickly opened in a uniform arrangement. The ribbon embodiment of the barrier 16 may be particularly useful as tape placed across a long slot in the shell 12 of the inflation device 10.

Alternatively, FIG. 12, also illustrates a possible ribbon of preformed barriers 16 creating by the apparatus 98 discussed above. After the ribbon has passed through the heat sealer 90 and has cooled, individual barriers 16 may be separated from the ribbon by preformed cuts 96 formed during the manufacturing process.

Furthermore, although specific components are described above, methods, systems, and articles of manufacture described herein may include additional, fewer, or different components. For example, some embodiments may have no water ports 26, or multiple water ports 26. Similarly, some embodiments may include one or multiple barriers 16.

Figure 13:
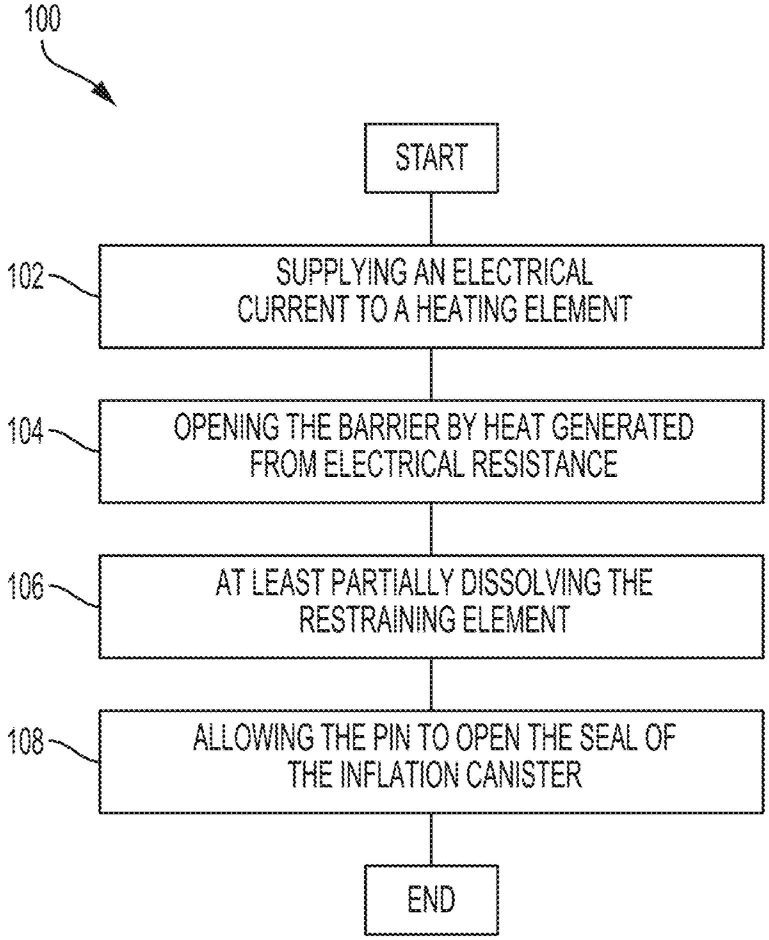
FIG. 13 illustrates a flow diagram of operations to activating an inflation device.

FIG. 13 illustrates a flow diagram of operations (100) to activate the inflation device 10. The operations may include fewer, additional, or different operations than illustrated in FIG. 13. Alternatively, or in addition, the operations may be performed in a different order than illustrated.

The operation of activating the inflation device 10 (100) may include supplying an electrical energy to the heating element 56 (102). The electrical energy may be provided from the electrical energy source 54. The electrical energy may meet electrical resistance within heating element 56, heating the heating element 56 and melting the fluid resistant skin 36. As the fluid resistant skin 36 melts or otherwise ruptures, the operation may also include opening the barrier 16 (104). As the barrier 16 opens, the operation may also include at least partially dissolving the restraining element 14 (106) as water or other fluids pass through the open barrier 16. As the restraining element 14 dissolves, the operation may also include allowing the piercing pin 18 to open the seal of the inflation canister (108), thereby inflating an attached floatation device.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

What is claimed is:

1. An inflation device comprising:
- a shell adapted to be coupled to an inflation canister;
- a pin positioned within the shell adapted to open a seal of the inflation canister;
- a restraining element positioned within the shell and arranged to prevent the pin from opening the seal of the inflation canister, wherein the restraining element is dissolvable; and
- a barrier positioned within the shell comprising a fluid resistant skin and a heating element coupled to the fluid resistant skin, wherein the barrier is adapted to prevent the restraining element from dissolving and wherein the heating element is adapted to open the barrier responsive to an electrical energy sent to the heating element.

2. The inflation device of claim 1, further comprising an energy source coupled to the heating element, wherein the energy source is adapted such that electrical energy from the energy source through the heating element heats the heating element.

3. The inflation device of claim 2, wherein the energy source is adapted to provide no more than 5 joules of energy to the heating element.

4. The inflation device of claim 2, wherein the energy source is adapted to open the barrier in no more than 1 second.

5. The inflation device of claim 2, further comprising a capacitor electrically coupled to the energy source and to the heating element, wherein the capacitor is adapted to store energy from the energy source and to selectively deliver energy to the heating element.

6. The inflation device of claim 2, further comprising:
- a switching circuit coupled to the energy source and to the heating element; and
- a sensor coupled to the switching circuit, wherein the switching circuit is adapted to direct electrical energy to the heating element responsive to a condition detected by the sensor.

7. The inflation device of claim 1, further comprising a biased striking mechanism separated from the pin by the restraining element, wherein once the restraining element is at least partially dissolved, the biased striking mechanism is adapted to force the pin through the seal of the inflation canister.

8. The inflation device of claim 1, further comprising a coiled spring coupled to the pin, wherein the restraining element is positioned within the shell to restrain expansion of the coiled spring such that when the restraining element is at least partially dissolved, the coiled spring is adapted to rotate and expand, thereby forcing the pin through the seal of the inflation canister.

9. The inflation device of claim 1, wherein the barrier is positioned to seal a port in a wall of the shell.

10. The inflation device of claim 1, wherein the barrier comprises a capsule containing a fluid capable of dissolving the restraining element.

11. A restraining element adapted to regulate inflation of an inflation device, the restraining element comprising:

a body comprising a dissolvable material;

a barrier enclosing at least a portion of the body, wherein the barrier comprises a fluid resistant skin adapted to prevent the body from dissolving; and a heating element coupled to the fluid resistant skin, wherein the heating element is adapted to open the barrier responsive to an electrical energy sent through the heating element.

12. The inflation device of claim 11, wherein the fluid resistant skin comprises a wax coating enclosing at least a portion of the restraining element, and wherein the heating element is adapted to melt the wax coating responsive to the electrical energy sent through the heating element.

13. The inflation device of claim 12, wherein the heating element is embedded within the wax coating.

14. The inflation device of claim 11, wherein the fluid resistant skin comprises polyethylene.

15. The inflation device of claim 11, wherein the heating element comprises nichrome.

16. A method of activating an inflation device comprising an inflation canister, a shell coupled to the inflation canister, a pin positioned within the shell, the pin adapted to open a seal of the inflation canister, a dissolvable restraining element positioned within the shell and adapted to prevent the pin from opening the seal of the inflation canister, a barrier adapted to prevent the restraining element from dissolving, and a heating element coupled to the barrier, the method comprising:

supplying an electrical energy to the heating element;

opening the barrier by heat generated from electrical resistance within the heating element;

at least partially dissolving the restraining element; and allowing the pin to open the seal of the inflation canister.

17. The method of claim 16, wherein supplying the electrical energy to the heating element comprises supplying no more than 5 joules of electrical energy over no more than 1 seconds.

18. The method of claim 16, further comprising charging a capacitor electrically coupled to the heating element, wherein supplying the electrical energy to the heating element comprises discharging the capacitor through the heating element.

19. The method of claim 18, further comprising:

operating an arming mechanism to close an electrical connection between a capacitor and an energy source; and charging the capacitor after operating the arming mechanism.

20. The method of claim 19, comprising:

sending a signal from a water pressure sensor to a switching circuit;

operating the switching circuit to electrically couple the capacitor and the heating element; and after charging the capacitor, discharging the capacitor through the heating element.

* * * * *